United States Patent [19]
Munday et al.

[11] Patent Number: 6,047,007
[45] Date of Patent: Apr. 4, 2000

[54] TRANSMISSION OF DATA ON MULTIRATE NETWORKS

[75] Inventors: Peter R Munday, Berkshire; Ian Goetz, Oxfordshire; Stephen M Gannon, Buckinghamshire, all of United Kingdom

[73] Assignee: British Telecommunications public limited company, London, United Kingdom

[21] Appl. No.: 08/983,578

[22] PCT Filed: Jul. 17, 1996

[86] PCT No.: PCT/GB96/01710

§ 371 Date: Jan. 2, 1998

§ 102(e) Date: Jan. 2, 1998

[87] PCT Pub. No.: WO97/04610

PCT Pub. Date: Feb. 6, 1997

[30] Foreign Application Priority Data

Jul. 21, 1995 [GB] United Kingdom .................. 9514956

[51] Int. Cl.[7] .................................. H04J 3/22; H04J 3/16
[52] U.S. Cl. ........................... 370/545; 370/505; 370/466
[58] Field of Search .................................... 370/545, 505, 370/503, 506, 329, 466; 375/216, 240, 241

[56] References Cited

U.S. PATENT DOCUMENTS 4,330,689  5/1982  Kang et al. ........................ 179/15.55
4,377,860  3/1983  Godbole ................................ 370/84
4,641,303  2/1987  Vogl ...................................... 370/84
5,400,328  3/1995  Burren et al. .......................... 370/79
5,412,760  5/1995  Peitz .................................. 370/95.1
5,768,308  6/1998  Pon et al. ............................ 375/219

FOREIGN PATENT DOCUMENTS 0 578 260   1/1994   European Pat. Off. .
91 15087   10/1991   WIPO .
93 00778    1/1993   WIPO .

Primary Examiner—Hassan Kizou
Assistant Examiner—Duc Ho
Attorney, Agent, or Firm—Nixon & Vanderhye P.C.

[57] ABSTRACT

Mobile radio units communicate at a lower bit-rate than the conventional switching rate of a fixed network. Such calls are identified by mobile-to-mobile recognizers which identify characteristic bit streams and handle calls appropriately. An incoming mobile-to-mobile recognizer normally routes the call to a digital to A-law transcoder. An outgoing mobile-to-mobile recognizer normally routes calls to a high bit-rate digital to A-law transcoder. If a call is established between two mobile users the first—mobile-to-mobile recognizer diverts the signal received to a bit stuffer which provides three null bits for every bit received over the air interface. The null bits may be random numbers, but preferably include a recognizable pattern which can be detected by the second mobile-to-mobile recognizer. By such "bit sutffing" a 64 kbit/s signal can be generated from a 16 kbit/s signal with minimal signal processing and without the need to transcode to A-law and back.

29 Claims, 4 Drawing Sheets

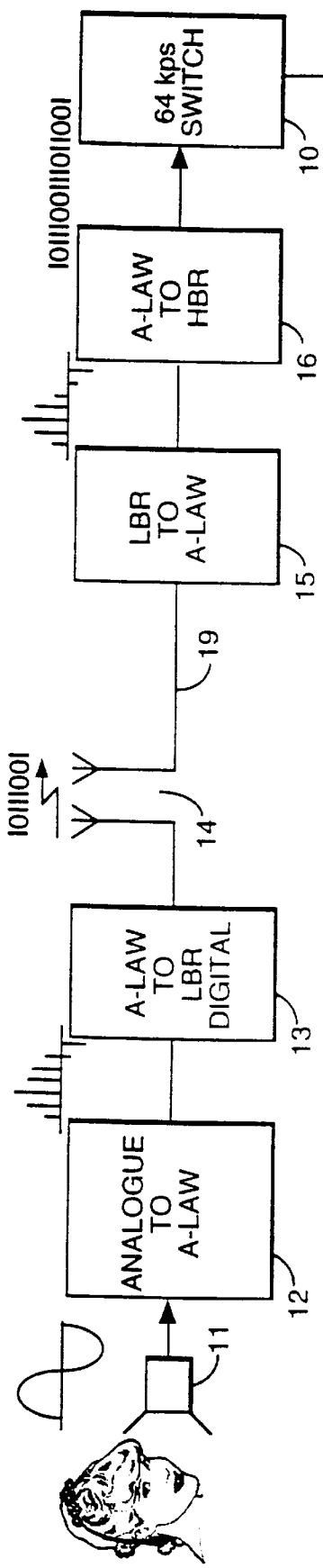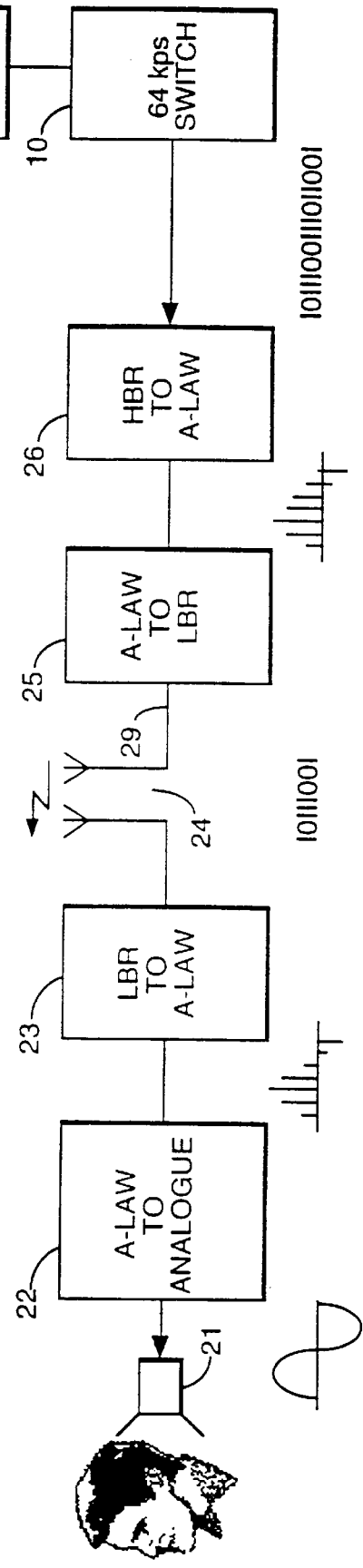

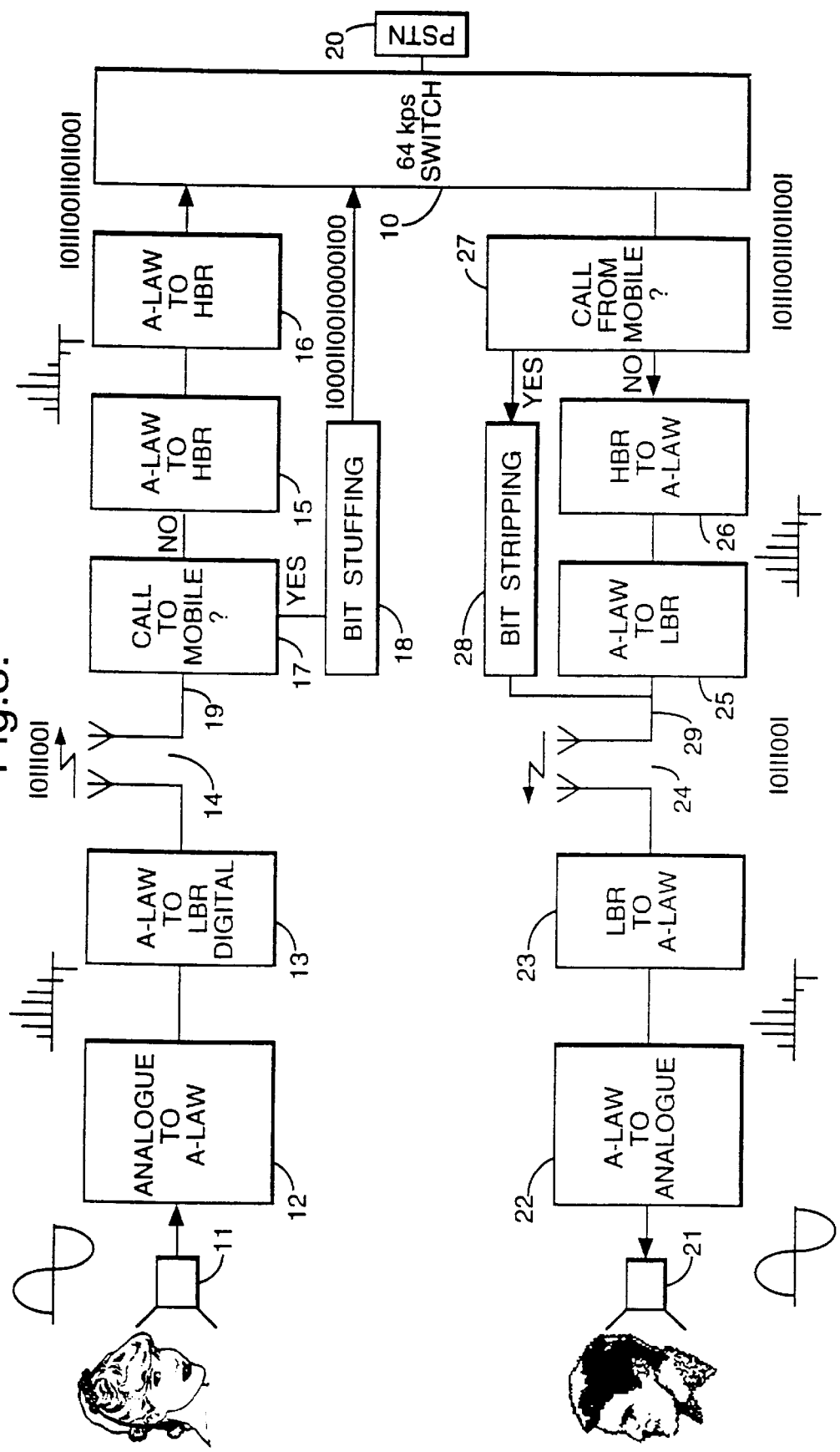

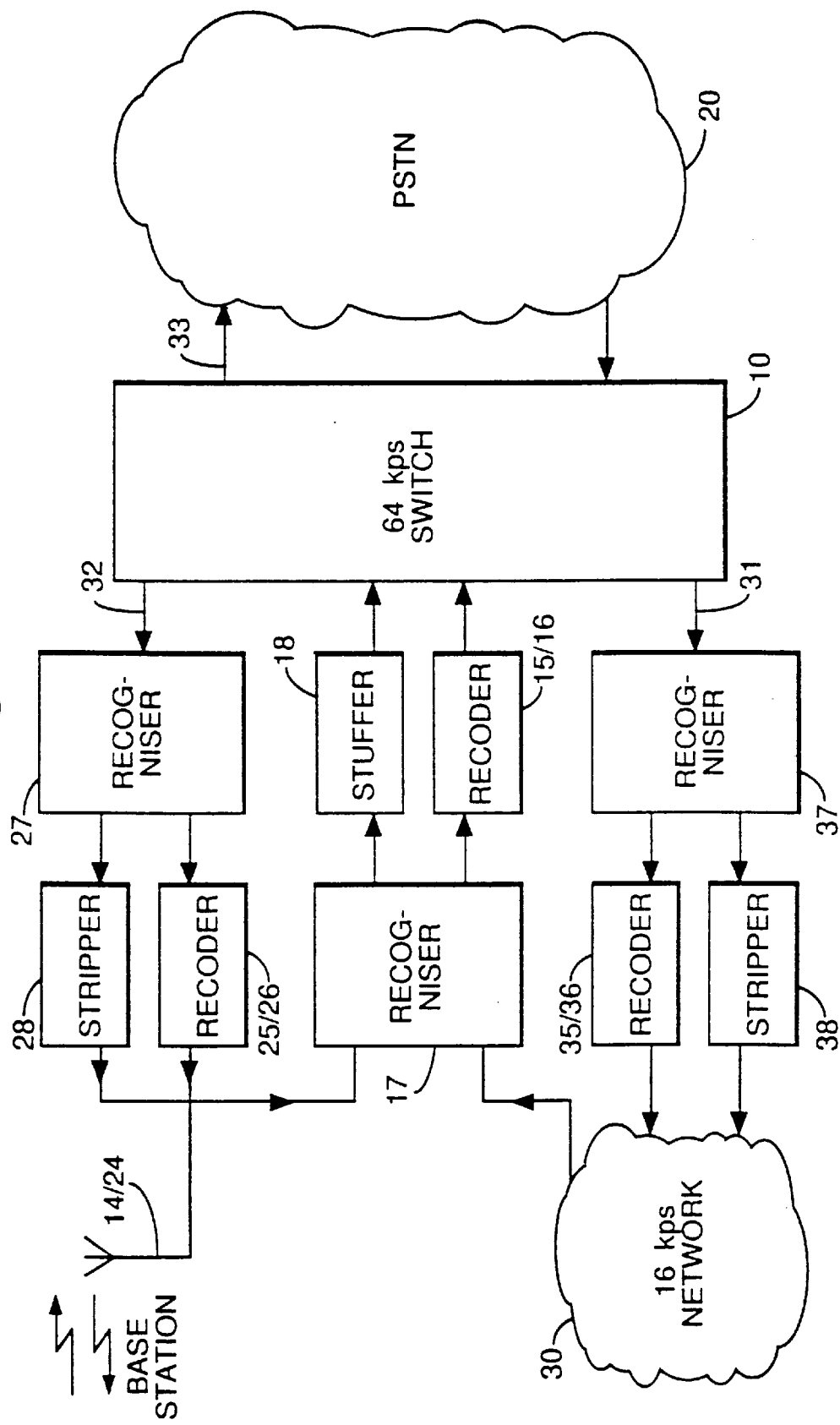

Fig.5.

| IMMEDIATE OUTPUT → | 16 kps | | 64 kps | | |
|---|---|---|---|---|---|
| FINAL DESTINATION → | LOCAL | 16 kps REMOTE | 64 kps REMOTE | LOCAL | 64 kps REMOTE | 16 kps REMOTE |
| INPUT 16 kps | STUFF INPUT/STRIP OUTPUT | STRIP OUTPUT | | RECODE INPUT | n/a | STUFF INPUT |
| INPUT 64 kps STUFFED | | | | | LEAVE UNCHANGED | LEAVE UNCHANGED |
| INPUT 64 kps CODED | RECODE OUTPUT | | RECODE OUTPUT | LEAVE UNCHANGED | | | ns. 1

TRANSMISSION OF DATA ON MULTIRATE NETWORKS

This invention relates to the transmission of digital signals over telecommunication networks. It has particular application to mobile radio networks, but also has application to various other types of networks.

In modern telecommunication systems individual calls are commonly handled as digital signals. Typically, in fixed telecommunications networks, an analogue signal is sampled once every 125 microseconds (i.e. 8000 times per second) and each sample is digitised as an 8-bit 'word', resulting in a data bit-rate of 64 kilobits per second (kbit/s). Such a high bit-rate allows high bandwidth, and therefore high quality, signals to be carried over the telecommunications network. The 64 kbit/s data bit-rate signal can be carried on any channel having a bit transport rate of 64 kbit/s or more, and such channels may be multiplexed onto systems having higher bit transport rates.

For some applications, much lower data bit-rates are sufficient for the quality of signal required. For example, for some purposes 13 kbit/s is considered an adequate data rate for carrying a digitised speech signal, because with modern data compression techniques the perceived loss of speech quality resulting from coding at such a low bit-rate can be kept to an acceptable level. A lower bit-rate requires a lower bandwidth to be required for each channel, thereby allowing more channels to be used within the same bandwidth, and so increasing the total capacity of the system. Such bit-rates are therefore desirable in applications where bandwidth is scarce, for example over the radio link between a mobile unit and base station of a mobile radio system (the so-called "air interface"). In the GSM (Global System for Mobile communications) system, speech coded at a rate of 13 kbit/s is actually carried on channels having a bit transport rate of 16 kbit/s. In the description to follow these will be referred to as 16 kbit/s signals.

A 64 kbit/s digital signal from a fixed network cannot be carried over the radio channel of a mobile system having a bit transport rate of oily 16 kbit/s. Therefore it is necessary to convert the 64 kbit/s signal into another format, suitable for transmission over the low bit-rate system. To do this, the original samples are regenerated (e.g. as 8 bit A-law) from the 64 kbit/s signal, and then transcoded as a 16 kbit/s coded signal. Decoding and recoding processes are not 100% accurate, and the decoding and recoding process therefore leads to a small reduction in the accuracy of the resulting signal.

A similar process is required if a signal having a low data bit-rate is to be carried over a system having a higher bit transport rate. In this case the system would be capable of transporting that data, but it would not be compatible with any data handling equipment en route nor with the destination terminal. In particular, the high bit transport rate system would fail to respond correctly to any signalling data transmitted at the slower rate. A signal coded at 16 kbit/s therefore has to be recoded into a 64 kbit/s format by regenerating the original coded format (e.g. 8 bit A-law) from the 16 kbit/s signal, and then transcoding at 64 kbit/s for transmission over the fixed part of the network. Such conversions are necessary wherever an interface occurs between systems using speech channels having different bit transport rates.

Typically, a mobile radio system uses 16 kbit/s speech channels, and a public switched telephone network (PSTN) use 64 kbit/s speech channels. A call between a user of one system and a user of the other would therefore encounter such an interface. In fact mobile radio systems often use the PSTN to provide parts of their trunk network, so a mobile-to-mobile call will often involve two such interfaces, and the reductions in accuracy caused by the conversion processes are compounded.

FIG. 1 illustrates the process involved in converting a speech signal first into a 16 kbit/s digital signal for transmission over the air interface, and then into a 64 kbit/s signal for carrying over a digital trunk network. A sound source 11, (e.g. a microphone) generates an analogue signal which is sampled by a suitable process such as A-law coding in a coder 1 2. A low bit-rate coder 13 in the user's handset transcodes from the 8-bit samples at a rate of 13 kbit/s using the GSM full rate RPE-LTP (Residual Pulse Excited—Long Term Predictor) coder system. To the coded speech are added forward error correction bits, which raise the radio interface bit-rate to 22.8 kbit/s. This signal is then transmitted over the air interface 14. At the base station the error correction bits are stripped off to leave the 13 kbit/s coded data signal, which is to be carried on a 16 kbit/s channel between the base station and the mobile switching centre. Four such 16 kbit/s channels are multiplexed into one 64 kbit/s timeslot of a 30 channel 2 Mbit/s system 19 connecting the base station to the mobile switching centre. At the mobile switching centre a transcoder (not shown) demultiplexes each of the thirty 64 kbit/s timeslots into four 16 kbit/s channels, each of which is fed to a coded digital-to-A-law transcoder 15 which transcodes the signal back to A-law. The signal is then transcoded to a 64 kbit/s binary signal in an A-law-to-high bit-rate transcoder 16. Each individual signal can then be handled by the 64 kbit/s switch 10, to supply a signal to the PSTN 20.

FIG. 2 illustrates the complementary process to that illustrated in FIG. 1, by which a 64 kbit/s signal is first transcoded to a 16 kbit/s binary signal for transmission over the air interface and then to an analogue signal for conversion to an audio signal at a receiver 21. These stages are essentially the reverse of those shown in FIG. 1. The 64 kbit/s binary signal from the PSTN 20 is routed via the 64 kbit/s switch 10 and is first transcoded in a transcoder 26 to an A-law signal. This signal is then transcoded to a low bit-rate (16 kbit/s) signal in a low bit-rate coder 25 through an air interface downlink 29 for transmission over the air interface 24 and reception by a further low bit-rate to A-law decoder 23. As with the uplink 19, the signal carried over the downlink 29 would normally be multiplexed with others. Again, the 16 kbit/s signal has error correction bits added for passage over the radio interface. The decoder 23 generates a further A-law signal for conversion in an A-law (digital) to analogue decoder (D to A converter) 22 to produce an analogue signal for reception by a receiver 21.

It will be seen that for transmission of a signal over the two air interfaces 14, 24 from one mobile user 11 to another mobile user 21, via a switch 10, the signal is coded into A-law four times, by A to D converter 12, low bit-rate digital to A-law transcoder 15, high bit-rate digital to A-law transcoder 26, and low bit-rate digital to A-law transcoder 23. Each of the four A-law signals is reconverted, by A-law to low bit-rate digital transcoder 13, A-law to high bit-rate digital transcoder 16, A-law to low bit-rate digital transcoder 25, and digital to analogue converter 22. If both terminations of a 64 kbit/s trunk link operate at 16 kbit/s the two transcoding processes both take place twice, once at each end of the trunk link. The resulting four transcodings lead to a relatively large compound inaccuracy, and also cause transmission delays, both of which reduce the quality of the call. International Patent Application WO91/5087 discloses a telecommunications network in which a uniform bit-rate is used for sending signals both to mobile network terminations and also to fixed network terminations. Rate adaptation is still required at the interface between the proposed network and the existing Public Switched Telephone Network.

It will be realised that in practice both air interfaces 14, 24, and both user terminals 11, 21 are designed for full duplex operation, but the reverse path has been omitted from FIGS. 1 and 2 for clarity.

International Patent Application WO95/24802, in the name of the present applicant, discloses a bandwidth management system in which blank data is added to compressed data so as to produce switchable words without decompressing the compressed data. An advantage of this arrangement is that standard switching devices, which are designed to switch data in non-compressed form, may be used. The compressed data is switched by these switches by adding blank data to the compressed data, thereby ensuring that a de-compression algorithm is not effected upon the compressed data in order for switching to take place. The added blank data is removed after switching and prior to re-transmission. This arrangement is possible when both parties to a call are operating to the same bit-rate, as would be the case with the closed user groups envisaged by the prior art document. However, in a cellular radio system, calls may be made between two mobile telephones both operable with compressed data, or between such a mobile unit and a fixed telephone or other termination unable to operate in this way. The two terminations may therefore operate at different bit-rates, and the assumption implicit in the prior art arrangement that the data can be handled in its compressed form at the remote end is no longer valid.

According to a first aspect of the present invention there is provided a method of transmitting signals comprising digitally coded data from a transmitting network element operating at a first bit-rate, over a telecommunications network path operating at a second, higher, bit-rate to a destination network element, the destination element being one of a plurality of receiving network elements, wherein a first group of the plurality of receiving network elements operate at the first bit-rate and a second group of the plurality of receiving elements operate at the a second bit-rate, the method comprising the steps of:

determining, for an original data-carrying signal coded at the first bit-rate to be transmitted from the transmitting network element to a destination network element, whether the destination network element is one of the first group of receiving network elements or one of the second group of receiving network elements, and (a) when the destination network element is one of the first group, generating a signal having a bit transport rate corresponding to the second, higher bit-rate, comprising the original digitally coded data and additional null data and (b) when the destination network element is one of the second group, generating a signal comprising data coded at the second bit-rate, and in either case transmitting the resulting signal.

According to a second, complementary, aspect of the invention, there is provided a method of generating signals, comprising digitally coded data, at a first bit-rate, from signals at a second, higher, bit-rate received over a telecommunications network path operating at a second, higher, bit-rate from an originating network element, the originating network element being one of a plurality of transmitting network elements, wherein a first group of the plurality of transmitting network elements generate signals which comprise data originally coded at the first rate with additional null data and a second group of the plurality of network elements generate signals which comprise data coded at the second bit-rate, the method comprising the steps of:

determining whether a signal received over the network path having a bit transport rate corresponding to the second bit-rate comprises data coded at the second bit-rate or data coded at the first bit-rate with said null data added, and (a) when the data is coded at the second bit-rate, transcoding it to a signal coded at the first bit-rate; and b) when the signal is coded at the first bit-rate with said null data added, removing the null data to reconstitute the original signal.

This invention allows a signal coded at a low bit-rate to be carried over a network having a higher bit transport rate without full conversion of the data. By doing this, four transcoding steps can be eliminated from the end-to-end procedure, thereby improving the signal quality. However, in contrast to the prior art system described above, signals can be transmitted between terminations operating at different bit-rates. It should be noted that the rate at which the data is coded in the data carrying signal, i.e. the number of information-bearing bits per unit time, is lower than the bit transport rate i.e. the total number of bits per unit time; the difference being the bit-rate of the null data. Effectively, the information carrying data has been multiplexed with null data. The duration of each individual bit is, of course, the reciprocal of the bit transport rate.

According to a third aspect of the invention there is provided apparatus for transmitting signals comprising digitally coded data from a transmitting network element operating at a first bit transport rate, over a telecommunications network path operating at a second, higher, bit transport rate, for reception by a destination network element, the destination network element being one of a plurality of receiving network elements, wherein a first group of the plurality of receiving network elements communicate with the network path over communications links operating at the first, low, bit transport rate and a second group of the plurality of receiving network elements communicate with the network path over communications links operating at the second, higher, bit transport rate, the apparatus comprising a transmitter interface having means for identifying a call being made to a member of the first group of receiving network elements, means for converting the original low bit transport rate signal of such calls to a high bit transport rate signal by transmitting the original data of the signal with null data, the combined bit-rates of the original data and the null data corresponding to the second bit transport rate.

According to a fourth aspect of the invention, there is provided apparatus for converting the bit transport rate of signals between a first, low, bit-rate and a second, higher bit-rate for transmission at the second bit-rate; the apparatus comprising: a transmitter interface having means for identifying if the onward routing of the signal includes a network element operating at the first bit transport rate; means for converting the bit transport rate signals so identified to said second bit-rate by transmitting the original coded data and sufficient null data bits such that the combined bit-rate of the original and null data corresponds to the second bit-rate, and means for transcoding coded data of the low bit-rate signals other than those so identified to data coded at the high bit-rate.

According to a fifth aspect, the invention provides apparatus for generating digitised signals comprising digitally coded data at a first bit transport rate from signals received from an originating network element over a telecommunications network path operating at a second, higher, bit transport rate, the originating network element being one of a plurality of transmitting network elements, wherein a first group of the plurality of transmitting network elements generate signals of a first type which comprise data originally coded at the first rate with additional null data, and a second group of the plurality of network elements generate signals of a second type which comprise data coded at the second bit-rate, the apparatus comprising a receiver interface having means for detecting whether the received signal is of the first type or the second type, and means responsive to the detecting means for converting the received signal to a signal coded at the first rate.

According to a sixth aspect of the invention, there is provided apparatus for converting the bit transport rate of received signals to a first, low, bit-rate from a second, higher bit-rate for transmission at the first bit-rate; the apparatus comprising: a receiving interface having means for detecting whether the received signal is of a first type comprising data originally coded at the first rate with the addition of null data, or of a second type comprising data originally coded at the second rate, and means responsive to the detection means for recovering the original signal from received signals of the first type by transmitting only the coded data and not the null data, and for converting received signals of the second type by transcoding the coded data of the signal from the second bit-rate to data coded at the first bit-rate.

The invention further embraces a telecommunications network including at least two elements in accordance with one or more of these aspects operating at the first bit-rate, at least one of which is a transmitting element and one of which is a receiving element, (some or all of which may be capable of both transmitting and receiving), and at least one element working at the second bit-rate. Accordingly, a seventh aspect of the invention provides a telecommunications network comprising a plurality of network elements, wherein a first group of the plurality of network elements operate at a first bit-rate and a second group of the plurality of network elements operate at a second, higher, bit-rate, and comprising network paths having a bit transport rate corresponding to the second, bit-rate, comprising means for identifying a call being made between members of the first group of elements, means for converting the original low bit transport rate signal of such calls to a high bit transport rate signal by transmitting the original data of the signal with null data, the combined bit-rates of the original data and the null data corresponding to the second bit transport rate, the null data including a conversion process identification signal; and a receiver interface having means for detecting the conversion process identification signal, and means for recovering the original coded signal by generating the original signal at the first bit transport rate without the null data if such identification signal is detected.

In one arrangement, the destination identification at the transmitting network element can be performed by identifying the telephone number being called. To cater for the possibility that a number translation service (e.g. call diversion) is in use by the called party, it is preferred that the destination identification is performed by identifying the actual destination, which is not necessarily the termination whose number was dialled by the calling party. This may be achieved by performing the destination identification in co-operation with a switching control system to identify the actual destination of the call.

Certain services such as three way calling (conference bridging) also require the use of the 64 kbit/s functionality of the switch. Again, this can be accommodated by linking the call-type identification to the switching control system.

At the receiving end, the determination of the signal type received can be performed by identifying the telephone number of the originating terminal.

Preferably each frame of the first, low bit-rate signal is loaded as part of a frame in a high bit-rate signal, the remaining parts of the frame being filled with null data, the signal carrying an identifier to indicate that the signal has been so converted for transmission through the high bit transport rate network.

At the receiving end, the presence or absence of the identifier in the received signal can then be detected; the presence of the identifier indicates that each frame of the low bit-rate signal is loaded as part of a frame in a high bit-rate signal, the remaining parts of the frame being filled with null data.

In a preferred embodiment each frame of the first low bit-rate signal is loaded as part of a frame in the high bit transport rate signal, the remaining parts of the frame being filled with null data (an operation known as 'bit stuffing'). The null data may include an identifier to indicate that the signal has been converted in this way for transmission through the high bit transport network, rather than undergoing full re-coding as a high bit-rate coded signal. The identifier may be a calling-line identity signal, recognisable by a receiving network element as corresponding to a network element operating at the low bit-rate.

Although described below with reference to a 16 kbit/s to 64 kbit/s conversion for communication between a mobile system and a fixed network (PSTN: public switched telephone network), the invention is applicable to other situations where an initial signal coded at a lower bit-rate is to be carried over an intermediate carrier, operating at a higher bit transport rate, to be received at a receiver operating at the lower bit-rate. This invention also has application where a signal is to be carried between two intermediate points of the complete end-to-end route at a lower bit transport rate, but is ultimately to be converted to a higher bit-rate. For example, in a cellular radio system a call to a fixed telephone may be routed from the mobile switching centre close to the mobile unit, through a second mobile switching centre, and enter the fixed (PSTN) network through the second mobile switching centre. The transmission between the mobile switching centres can be carried at the lower bit transport rate, conversion to 64 kbit/s A-Law coding used on the PSTN only taking place at the mobile switching centre through which the call enters the PSTN. This reduces the capacity required by the fixed transmission links of the cellular radio network. The term "network element", as used in this specification is therefore to be read as embracing intermediate elements and not necessarily the ultimate origin or ultimate destination of a call. The high bit transport rate may be used between two high-bit-rate switching centres (exchanges), or it may be used on the routing through a single such centre, and the term "network path" should be construed accordingly.

By the method of the invention, low data rate network elements of the first group can communicate with standard high bit-rate elements of the second group, since the method of the invention identifies whether a call is being made between two members of the first group of elements. If a call is made from a low bit-rate element to a high bit-rate element, the call will be coded to the high bit-rate in the conventional manner. Similarly if a call is made from a high bit-rate-element to a low bit-rate element the call will be coded to the lower bit-rate in the conventional manner by the receiving element interface. This is not possible in the prior art arrangement discussed above.

Exemplary embodiments of the invention will be further described, by way of example, with reference to the accompanying drawings in which:

FIG. 1 shows a prior art arrangement for the transmission of a signal from a mobile unit through a high bit-rate network (PSTN).

FIG. 2 shows a prior art arrangement for the transmission of a signal through a high bit-rate network to a low bit-rate mobile unit.

FIG. 3 shows an apparatus according to the invention for the transmission of signals between two low bit-rate mobile units, or between one such unit and a high bit-rate unit, through a high bit-rate network.

FIG. 4 is a diagrammatic representation of a switching centre incorporating the invention.

FIG. 5 is a table showing the procedures carried out in the switching centre of FIG. 4.

FIGS. 1 and 2 are described above in relation to the prior art. The apparatus of FIG. 1 comprises a mobile unit comprising a sound source 11, (e.g. a microphone), a coder 12, and a transcoder 13, for conversion of signals between one coding system and another, connected by an air interface 14 and a multichannel connection 19 to a mobile switching centre uplink unit in which are two further transcoders 15, 16. The uplink unit is connected to a switch 10 for connecting to a switched network 20.

The apparatus of FIG. 2 comprises a mobile unit having a sound generator 21, (e.g. a loudspeaker), a decoder 22, and a transcoder 23, for conversion of signals between one coding system and another, the mobile unit being connected by an air interface 24 and a multichannel connection 29 to a mobile switching centre downlink unit in which are two further transcoders 25, 26. The downlink unit is connected to a switch 10 for connection to a switched network 20.

The apparatus of FIG. 3 is largely the same as that of FIGS. 1 and 2, except for a number of additional components, and like components are identified by like reference numerals in these three figures. The apparatus shown in FIG. 3 comprises a mobile unit comprising a sound source 11, (e.g. a microphone), a coder 12, and a transcoder 13, for conversion of signals between one coding system and another, connected by an air interface 14 and a multichannel connection 19 to a mobile switching centre uplink unit in which there is a call-type recogniser 17, two further transcoders 15, 16, a bit stuffer 18 and a switch 10 for connecting to a switched network 20, and to a mobile switching centre downlink unit in which are a call-type recogniser 27, a bit stripper 28, and two further transcoders 25, 26. As in FIG. 2, the apparatus of FIG. 3 also comprises a mobile unit having a sound generator 21, (e.g. a loudspeaker), a decoder 22, and a transcoder 23, for conversion of signals between one coding system and another, the mobile unit being connected by an air interface 24 and a multichannel connection 29 to a mobile switching centre downlink unit.

In FIG. 4 features common with the embodiment of FIG. 3 again have the same reference numerals. FIG. 4 shows in diagrammatic form a mobile switching centre comprising a switch 10, whose data switching speed is 64 kbit/s, connected to a network 20 which also operates at 64 kbit/s. The switch 10 is also connected to a network 30 which operates at 16 kbit/s and to a mobile radio network base station 14/24 which, by means of low bit-rate coding, also operates at the lower bit-rate of 16 kbit/s. In practice, there would normally be several base stations connected to the switch in this way.

The air interface 14/24 and the 16 kbit/s network 30 are connected to the switch 10 through a call-type recogniser 17, which routes incoming traffic to the switch 10 through either a bit stuffer 18 or a recoder 15/16, according to the type of call. Calls passing from the switch 10 to the base station air interface 14/24 are routed through a call-type recogniser 27 and then, according to the type of call, through either a bit stripper 28 or a recoder 25/26. Calls passing from the switch 10 to the 16 kbit/s network air interface 30 are routed through a call-type recogniser 37 and then, according to the type of call, through either a bit stripper 38 or a recoder 35/36. Calls passing to or from the 64 kbit/s network 20 undergo no intermediate transcoding or other conversion process, being handled directly by the switch 10.

The operation of the system of FIG. 3 according to the invention will now be described. As in the prior art arrangement shown in FIG. 1, the sound source 11 produces an analogue output which is sampled in a coder 12 by a suitable process such as A-law coding. The output from this coder 12 is fed to a transcoder 13 which codes the A-Law coding into the Low Bit-rate system. The output from the transcoder 13 is then transmitted over the air interface 14 between a mobile unit and a base station, and then over a 30 channel 2 Mbit/s uplink 19 connecting the base station to the mobile switching centre. At the mobile switching centre a transcoder (not shown) demultiplexes each of the thirty 64 kbit/s timeslots into four 16 kbit/s channels (only one shown). In a departure from the prior art arrangement of FIG. 1, each of these channels is next fed to a recogniser 17. The recogniser 17 identifies the destination of a call. It may make use of the number dialled by the user 11 to identify whether the destination user terminal is another low-bit-rate termination (e.g. another mobile unit such as the user 21). However, the user of the dialled number may have set up a call diversion to a terminal in the fixed network which is not a low-bit-rate termination. The converse situation is also possible, in which the user of a 64 kbit/s destination has diverted incoming calls to a 16 kbit/s termination. Accordingly, as part of the call set-up procedure, the recogniser 17 is controlled by the switching control system forming part of the switch 10 to identify the actual destination of the call, as distinct from the number dialled by the originator of the call. If the call requires functionality (e.g. a conference bridge) which requires use of a 64 kbit/s function within the network, this is also identified by the recogniser 17, under the control of the switch functionality 10, as not suitable for the bit stuffing procedure.

The recogniser 17 diverts any calls that it identifies as being for a 16 kbit/s termination to a bit stuffer 18 and then directly to the switch 10, by-passing the transcoders 15, 16 which are only used for calls not so identified. When a call is established between two mobile users 11, 21 the recogniser 17 identifies such a call, for example by number recognition in the call set up phase and diverts the signal received over the air interface 14 to a bit stuffer 18. The bit stuffer 18 creates 64 kilobit frames from 16 kilobit frames by providing three null bits for every bit received over the air interface. The distribution of the bits may be according to any predetermined plan. For example, the information bits may be grouped in pairs, with six null bits between each pair. The null bits may be random numbers, but preferably include a recognisable pattern which can be detected by a second recogniser 27.

By "bit stuffing" in this way a 64 kbit/s signal bit transport rate can be generated from a 16 kbit/s data rate signal with minimal signal processing and without the need to transcode to A-law and back. This uprated 64 kbit/s signal is now compatible with the network elements 10, and can be transmitted to a point in the network where reconversion to the low bit transport rate is required. This may be within the same switch 10, as illustrated for simplicity, but it may be at a different switching centre elsewhere in the network.

Those calls not identified by the recogniser 17 as suitable for such treatment (for instance, those going to fixed terminals in the PSTN 20 ) are passed to the digital-to-A-law transcoder 15 which transcodes the low bit-rate signal back to A-law, and then to the A-law-to-high bit-rate transcoder 16 which converts the signal to a signal coded at a full 64 kbit/s, as described above in relation to the prior art arrangement of FIG. 1.

In the return path from the switch 10 to the user 21 a 64 kbit/s signal received by the switch 10 is first passed to a recogniser 27. The recogniser 27 may be controlled, either at the call set-up stage by recognition of the identity of the calling number, or by recognition of the characteristic pattern of null bits in a bit-stuffed signal generated by a bit stuffer 18, and routes signals identified as being of the bit-stuffed form to the bit stripper 28 instead of to the digital-to-A-law transcoder 26. The bit stripper 28 removes the null bits and transmits only the signals making up the original 16 kbit/s signal.

Calls not so identified (e.g. those from fixed terminations in the PSTN 20 ) are routed to the transcoder 26 as in the prior art arrangement of FIG. 2. The transcoder 26 transcodes such signals to A-Law, and the transcoder 25 then transcodes the A-Law signal to a low bit-rate (16 kbit/s) signal. The 16 kbit/s signal, whether generated by the bit stripper 28 or the transcoders 26, 25, is then carried, over a thirty channel multiplexed downlink 29 and the air interface 24, to a mobile unit in which this low bit-rate signal is transcoded to A Law by the transcoder 23 and then decoded to produce an analogue audio signal by the decoder 22. This analogue signal drives the loudspeaker 21. As with the uplink 19, the signals carried over the downlink 29 are normally multiplexed. Again, the 16 kbit/s signal has error correction bits added for passage over the radio interface.

The recogniser 27 may be controlled during the call set up stage by the switching control system forming part of the switch 10, or they may operate autonomously, in which case the bit stuffer 18 must provide a characteristic signal identifiable by the recogniser 27.

It will be appreciated that most call traffic is a two-way process. For clarity only one direction of call traffic is shown. However, it will be apparent that the recognisers 17, 27 will each co-operate with corresponding recognisers to allow the return traffic to be routed similarly.

The recogniser 17, bit stuffer 18, digital to A-law coder 15, A-law to high bit-rate digital transcoder 16, mobile to mobile recogniser 27, bit stripper 28, high bit-rate to digital to A-law transcoder 26, and A-law to low bit-rate digital transcoder 25 may all form part of a mobile switching centre. In the figures only one air interface uplink 19 and air interface downlink 29 are shown. Four low bit-rate signals may be multiplexed together between the air interface 14 and the mobile switching centre 10, thereby achieving a fourfold reduction in the capacity requirements of the link between the air interfaces 14, 24 and the mobile switching centre 10. However, the resulting 64 kbit/s bit transport rate signal cannot be handled as one signal by the mobile switching centre, as the four 16 kbit/s elements require different routings. Therefore the four elements must be demultiplexed to individual 16 kbit/s signals before switching.

The operation of the system of FIG. 4 will now be described. The base station 14/24 both transmits and receives radio signals. Incoming call traffic to the base station 14 is first received in a call recogniser 17 from which it is routed either to a bit stuffer 18 or to a recoder 15/16 as is described above with reference to FIG. 3, in order to convert the signal to a 64 kbit/s signal for switching in the switch 10. The call recogniser 17 may operate autonomously, by identifying the destination of the call, for example by identifying the network termination being called. Alternatively, and preferably, it may be controlled by the switch 10. This allows call diversion and other number translation facilities to be accomodated. The switch 10 routes the call either to the 64 kbit/s network 20, to the 16 kbit/s network 30 or to a transmitting base station 24. If the two parties to a call are in the same cell of the cellular network, the transmitting base station may be the same base station as the receiving base station 14, as shown, but it will more typically be a different base station. (Only one base station is shown in the figure, for clarity). The call recogniser 17 routes any call intended either for a local base station 24, or for routing by the 16 kbit/s network 30, by way of the bit stuffer 18. Any call which is to be routed by the 64 kbit/s network 20, but ultimately destined for a 16 kbit/s termination, is also bit stuffed. Any other call destined for transmission by the 64 kbit/s network 20, which will not be subsequently reconverted to 16 kbit/s format, is routed by way of the recoder 15/16.

The switching in the switch 10 is carried out at 64 kbit/s, and operates in exactly the same way regardless of whether the signal has been bit stuffed or has a high bit-rate 64 kbit/s coding. The call is ultimately routed to one of the switch outputs, only three of which are shown (31, 32, 33). The first output 31 leads to the 16 kbit/s network 30. The second output 32 leads to the 16 kbit/s transmitting base station 24. The third output 33 leads into the 64 kbit/s network 20.

Signals transmitted over this latter output 33 are carried unmodified over the switched network, complete with additional bit stuffed digits or in their 64 kbit/s coded form. Signals output to either the 16 kbit/s network 30 through output 31 or to the transmitting base station 24 through output 32 have to be converted from 64 kbit/s (bit stuffed or conventional high bit-rate coded) to the 16 kbit/s format. The signals are firstly output to a signal recogniser 27, 37 which identifies whether the signal is in the high bit-rate coded form or the bit stuffed form. This may be done either by identifying the origin of the call, or by identifying characteristic features of the coding system recognisable from the form of the signal received by the recogniser 27, 37.

If the recogniser 27, 37 identifies the signals as being in normal high bit-rate form (i.e. in 64 kbit/s format), for instance because it has been received over the 64 kbit/s network 20 originating from a fixed telephone, the signal is passed to a recoder 25/26, or 35/36, having the same functions as the high bit-rate A-Law decoder 26 and A-Law to low bit-rate coder 25 described with reference to FIG. 3 above. The recoding process firstly transcodes the 64 kbit/s signal to the standard A-Law system as described above with reference to FIG. 3, and then from A-Law to the low bit-rate system suitable for transmission over the 16 kbit/s network 30 or over the air interface from the base station transmitter 24.

If the recogniser 27, 37 identifies the signal as being in bit stuffed form, either recognising characteristics of that format, or by means of a calling line identity or similar control signal received from the switch 10, the signal is sent to a bit stripper 28, 38 for removal of the surplus digits and onward transmission to the 16 kbit/s network or base station transmitter 24.

The mobile switching centre as described with reference to FIG. 4 allows signals to be switched from any one of the base station 14, the 16 kbit/s network 30, or the 64 kbit/s network 20, to any one of the outputs 31, 32, 33. So for example a call received from a base station 14 by the switch 10 can be retransmitted from the same or another base station 24, or into the 16 kbit/s network 30 or into the 64 kbit/s network 20. Similarly a call from the 16 kbit/s network 30 may be switched by the switch 10 either for onward transmission over the 16 kbit/s network 30, or to a base station 24, or into the 64 kbit/s network 20. Again similarly, a call received from the 64 kbit/s network 20 may be switched by the switch 10 for routing back over the network 20, or into one of the 16 kbit/s outputs 31, 33 for the 16 kbit/s network 30 or base station transmitter 24.

FIG. 5 sets out in a table the processes carried out on the signal in each of these circumstances. There are three types of input to the mobile switching centre, namely 16 kbit/s, 64 kbit/s bit stuffed and 64 kbit/s coded. These signals may be routed by the switch 10 to any of six possible outward routings, as follows:

- to a local termination at 16 kbit/s (e.g. the base station transmitter 24)
- to a remote 16 kbit/s termination by way of the 16 kbit/s network 30,
- ultimately to a 64 kbit/s termination, initially by way of the 16 kbit/s network 30,
- to a local 64 kbit/s termination by way of the 64 kbit/s network 20,
- to a remote 64 kbit/s termination by way of the 64 kbit/s network 20,
- ultimately to a 16 kbit/s destination, initially by way of the 64 kbit/s network 20.

For any 16 kbit/s input, the signal has to be converted to 64 kbit/s for switching purposes in the switch 10. The 16 kbit/s input signal is transcoded to a normal 64 kbit/s signal in the recoder 15/16 only if both the following two conditions are met:

- the call is to be output from the 64 kbit/s output 33 into the 64 kbit/s network 20;
- the final destination of the call is also a 64 kbit/s termination.

In all other cases the call is routed by the recogniser 17 to the bit stuffer 18, so that the 64 kbit/s signal to be handled by the switch 10 is in bit-stuffed form. If the signal is output through either of the outputs 31, 32, (for transmission over the 16 kbit/s network 30 or to the 16 kbit/s transmitter 24), the output signal is recognised as a bit stuffed signal by the recogniser 27 or 37 and bit stripped by the bit stripper 28 or 38 for onward transmission as a 16 kbit/s signal. If the signal is to be transmitted to a 16 kbit/s remote terminal by way of the 64 kbit/s network the signal remains in its bit stuffed form at the output 33 into the 64 kbit/s network 20, and will be recognised at the destination switch as being in bit stuffed form in the manner which is to be described below.

For a 64 kbit/s bit stuffed signal received from the 64 kbit/s network 20, the signal is handled, still in its 64 kbit/s bit stuffed form, by the switch 10 and then output to one of the outputs 31, 32 leading to the 16 kbit/s network 30 or to a 16 kbit/s base station 24. The recognisers 27, 37 identify the signal as being a bit stuffed signal and route it by way of one of the bit strippers 28, 38 to convert it to a 16 kbit/s signal for onward transmission to the base station 24 or network 30.

If the signal received from the 64 kbit/s network 20 is a 64 kbit/s bit stuffed signal and is to be transmitted onward by way of the 64 kbit/s network to a 16 kbit/s remote destination signal, it can be carried through the switch 10 and back into the 64 kbit/s network 20 without any conversion, remaining in its bit stuffed form throughout its passage through the mobile switching centre.

In the case of a 64 kbit/s conventionally coded signal received by the switch over the network 20, if the signal is output from the switch over one of the outputs 31, 32 leading to a 16 kbit/s destination 24, 30 the coded format of the signal is identified by the identifier 27, 37 and the signal routed by way of the recoders 25/26, 35/36 for conversion to the 16 kbit/s format as described above for onward transmission to the base station 24 or 16 kbit/s network 30. A 64 kbit/s conventionally coded signal received from the network 20 by the switch 10 which is to be retransmitted at the 64 kbit/s rate requires no conversion, being switched throughout at 64 kbit/s.

Signals are only carried over the 64 kbit/s network 20 in bit stuffed form if they are to be carried over a 16 kbit/s section at some subsequent stage. It follows that there is no need for provision in the 64 kbit/s output 33 from the switch 10 to recognise the type of signal. If it is bit stuffed, it will be converted on arrival at its 16 kbit/s destination. If it is not intended for a 16 kbit/s destination, it will already be in 64 kbit/s coded format, having already been transcoded to that format at the originating switch if necessary.

In the event that some of the mobile switching centres connected to the network 20 do not have the bit stuffing facility, then a call to or from such a switching centre is handled by the switching centres of FIGS. 3 and 4 as an ordinary call, to be recoded to or from the 64 kbit/s system. The recognisers 17, 27, 37 treat such calls as they would any other call going to or from a network element operating at 64 kbit/s.

It should be recognised that parts of the network may operate at even higher transmission bit-rates, e.g. the 64 kbit/s line may itself be multiplexed with others. However, at the point of interface, the transmission bit-rate of a conventional PSTN system is 64 kbit/s.

The invention has been described with reference to signals coded using the 8-bit A-Law system, in accordance with the GSM standard (Global System for Mobile Communications to CCITT G.711), although it is not limited to this system, and may be used in conjunction with, for example the 13 bit linear coding system or the U-Law system. The A-Law and U-Law systems use 'logarithmic' type quantisation scales to encode the samples. This gives more quantisation levels for low amplitude signals and fewer for higher amplitude signals. This effectively enables more detail to be given to quiet talkers in telephone conversations. Such an encoder produces the same amount of distortion as a 13 bit linear encoder. A-Law codecs as used in Europe, and U-law (mu-law) codecs as used in the U.S.A. and Japan, use slightly different logarithmic quantising scales.

We claim:

1. A method of transmitting signals comprising digitally coded data from a transmitting network element operating at a first bit-rate, over a telecommunications network path operating at a second, higher, bit-rate to a destination network element, the destination element being one of a plurality of receiving network elements, wherein a first group of the plurality of receiving network elements operate at the first bit-rate and a second group of the plurality of receiving elements operate at the a second bit-rate, the method comprising the steps of:

determining, for an original data-carrying signal coded at the first bit-rate to be transmitted from the transmitting network element to a destination network element, whether the destination network element is one of the first group of receiving network elements or one of the second group of receiving network elements, and (a) when the destination network element is one of the first group, generating a signal having a bit transport rate corresponding to the second, higher bit-rate, comprising the original digitally coded data and additional null data and b) when the destination network element is one of the second group, generating a signal comprising data coded at the second bit-rate, and in either case transmitting the resulting signal.

2. A method according to claim 1, in which the destination identification at the transmitting network element is performed by identifying the telephone number dialled by the party originating the call.

3. A method according to claim 1 in which the destination identification is performed by co-operation with a switching control system to identify the actual destination of the call.

4. A method according to claim 1, in which each frame of the first, low bit-rate signal is loaded as part of a frame in a high bit-rate signal, the remaining parts of the frame being filled with null data, the signal carrying an identifier to indicate that the signal has been so converted for transmission through the high bit transport rate network.

5. A method according to claim 4, wherein the identifier is a calling-line identity signal identifying the network terminal from which the call originates.

6. A method according to claim 5, wherein the identifier is carried in the null data inserted in the transmission.

7. A method of generating signals, comprising digitally coded data, at a first bit-rate, from signals at a second, higher, bit-rate received over a telecommunications network path operating at a second, higher, bit-rate from an originating network element, the originating network element being one of a plurality of transmitting network elements, wherein a first group of the plurality of transmitting network elements generate signals which comprise data originally coded at the first rate with additional null data and a second group of the plurality of network elements generate signals which comprise data coded at the second bit-rate, the method comprising the steps of:

determining whether a signal received over the network path having a bit transport rate corresponding to the second bit-rate comprises data coded at the second bit-rate or data coded at the first bit-rate with said null data added, and (a) when the data is coded at the second bit-rate, transcoding it to a signal coded at the first bit-rate; and (b) when the signal is coded at the first bit-rate with said null data added, removing the null data to reconstitute the original signal.

8. A method according to claim 7, in which the determination of the signal type received is performed by identifying the telephone number of the originating terminal.

9. A method according to claim 7, the method comprises the recognition of the presence or absence of an identifier in the received signal, the presence of which indicates that each frame of the low bit-rate signal is loaded as part of a frame in a high bit-rate signal, the remaining parts of the frame being filled with null data.

10. A method according to claim 9, wherein the identifier is a calling-line identity signal identifying the network terminal from which the call originates.

11. A method according to claim 10, wherein the identifier is carried in the null data inserted in the transmission.

12. Apparatus for transmitting signals comprising digitally coded data from a transmitting network element operating at a first bit transport rate, over a telecommunications network path operating at a second, higher, bit transport rate, for reception by a destination network element, the destination network element being one of a plurality of receiving network elements, wherein a first group of the plurality of receiving network elements communicate with the network path over communications links operating at the first, low, bit transport rate and a second group of the plurality of receiving network elements communicate with the network path over communications links operating at the second, higher, bit transport rate, the apparatus comprising a transmitter interface having means for identifying a call being made to a member of the first group of receiving network elements, means for converting the original low bit transport rate signal of such calls to a high bit transport rate signal by transmitting the original data of the signal with null data, the combined bit-rates of the original data and the null data corresponding to the second bit transport rate.

13. Apparatus according to claim 12, further comprising called-number recognition means for identifying whether a call destination is a member of the first group of receiving network elements.

14. Apparatus according to claim 12 wherein the null data includes a conversion process identification signal.

15. Apparatus according to claim 12, in which the means for identifying the destination or routing of a call co-operates with a switching control system to identify the actual destination of the call.

16. Apparatus according to claim 12 comprising means for loading each frame of the low bit-rate signal as part of a frame in a high bit transport rate signal, the remaining parts of the frame being filled with null data.

17. An element of a telecommunications system having apparatus according to claim 12 for conversion of signals comprising digitally coded data from a first bit transport rate to a second, higher, bit transport rate and apparatus for conversion of signals from the second bit transport rate to the first bit transport rate, comprising: digitally coded data at first bit transport rate from signals received from an originating network element over a telecommunications network path operating at a second, higher, bit transport rate, the originating network element being one of a plurality of transmitting network elements, wherein a first group of the plurality of transmitting network elements generate signals of a first type which comprise data originally coded at the first rate with additional null data, and a second group of the plurality of network elements generate signals of a second type which comprise data coded at the second bit-rate, the apparatus comprising a receiver interface having means for detecting whether the received signal is of the first type or the second type, and means responsive to the detecting means for converting the received signal to a signal coded at the first rate.

18. A telecommunications network comprising at least one originating apparatus according to claim 12 and at least one destination apparatus and at least one network path operating at the second, higher, bit-rate, said designation apparatus comprising: digitally coded data at first bit transport rate from signals received from an originating network element, over a telecommunications network path operating at a second, higher, bit transport rate, the originating network element being one of a plurality of transmitting network elements, wherein a first group of the plurality of transmitting network elements generate signals of a first type which comprise data originally coded at the first rate with additional null data, and a second group of the plurality of network elements generate signals of a second type which comprise data coded at the second bit-rate, the apparatus comprising a receiver interface having means for detecting whether the received signal is of the first type or the second type, and means responsive to the detecting means for converting the received signal to a signal coded at the first rate.

19. Apparatus for converting the bit transport rate of signals between a first, low, bit-rate and a second, higher bit-rate for transmission at the second bit-rate; the apparatus comprising: a transmitter interface having means for identifying if the onward routing of the signal includes a network element operating at the first bit transport rate; means for converting the bit transport rate signals so identified to said second bit-rate by transmitting the original coded data and sufficient null data bits such that the combined bit-rate of the original and null data corresponds to the second bit-rate, and means for transcoding coded data of the low bit-rate signals other than those so identified to data coded at the high bit-rate.

20. Apparatus for generating digitised signals comprising digitally coded data at a first bit transport rate from signals received from an originating network element, over a telecommunications network path operating at a second, higher, bit transport rate, the originating network element being one of a plurality of transmitting network elements, wherein a first group of the plurality of transmitting network elements generate signals of a first type which comprise data originally coded at the first rate with additional null data, and a second group of the plurality of network elements generate signals of a second type which comprise data coded at the second bit-rate, the apparatus comprising a receiver interface having means for detecting whether the received signal is of the first type or the second type, and means responsive to the detecting means for converting the received signal to a signal coded at the first rate.

21. Apparatus according to claim 20 wherein the detecting means comprise means for detecting a conversion process identification signal carried by signals of the first type.

22. Apparatus according to claim 21, wherein the detection means is means for identifying a calling-terminal signal and means for comparing said signal with a store of such signals corresponding to the first group of network elements.

23. Apparatus for converting the bit transport rate of received signals to a first, low, bit-rate from a second, higher bit-rate for transmission at the first bit-rate; the apparatus comprising: a receiving interface having means for detecting whether the received signal is of a first type comprising data originally coded at the first rate with the addition of null data, or of a second type comprising data originally coded at the second rate; and means responsive to the detection means for recovering the original signal from received signals of the first type by transmitting only the coded data and not the null data, and for converting received signals of the second type by transcoding the coded data of the signal from the second bit-rate to data coded at the first bit-rate.

24. A telecommunications network comprising a plurality of network elements, wherein a first group of the plurality of network elements operate at a first bit-rate and a second group of the plurality of network elements operate at a second, higher, bit-rate, and comprising network paths having a bit transport rate corresponding to the second bit-rate, comprising means for identifying a call being made between members of the first group of elements, means for converting the original low bit transport rate signal of such calls to a high bit transport rate signal by transmitting the original data of the signal with null data, the combined bit-rates of the original data and the null data corresponding to the second bit transport rate, the null data including a conversion process identification signal; and a receiver interface having means for detecting the conversion process identification signal, and means for recovering the original coded signal by generating the original signal at the first bit transport rate without the null data if such identification signal is detected.

25. A telecommunications network according to claim 24, further comprising called number recognition means for identifying whether a call destination is a member of the first group of network elements.

26. A telecommunications network according to claim 24 further comprising called-number recognition means for identifying whether a call destination is a member of the first group of receiving network elements.

27. A telecommunications network according to claim 24 comprising means for loading each frame of the low bit-rate signal as part of a frame in a high bit transport rate signal, the remaining parts of the frame being filled with null data, the receiving interface including means for recognising that the signal has been so converted for transmission through the high bit transport rate network.

28. A telecommunications network according to claim 27 wherein the recognition means is means for identifying a calling-terminal signal and means for comparing said signal with a store of such signals corresponding to the first group of network elements.

29. A telecommunications network according to claim 28 comprising means for inserting in the high bit transport rate signal an identifier, and means in the receiver interface for recognising the presence or absence of the identifier.

* * * * *